(No Model.)
J. E. FORD.
STEAM COOKER.
No. 436,228. Patented Sept. 9, 1890.
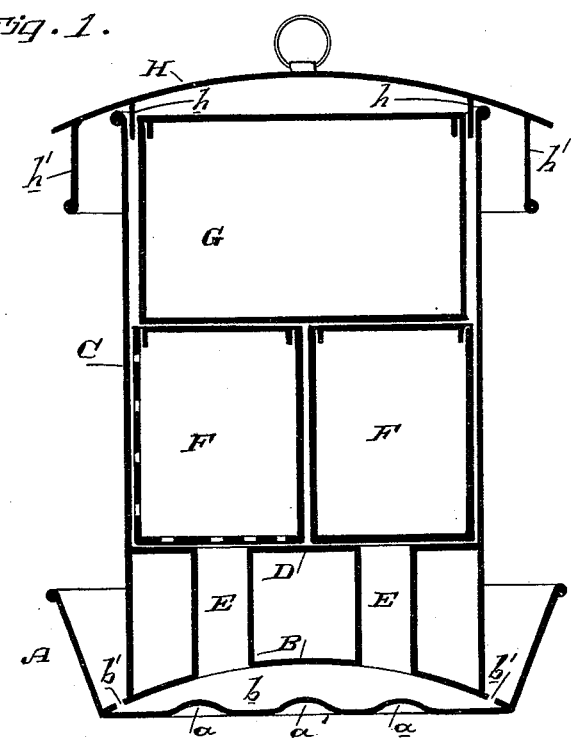
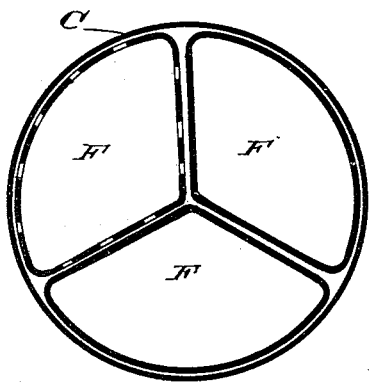
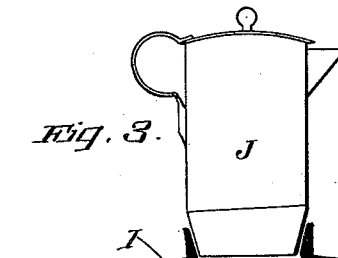
Witnesses,
Geo. H. Strong.
Inventor,
Jane E. Ford.
By Dewey & Co.
Attys

UNITED STATES PATENT OFFICE.

JANE E. FORD, OF ROSS STATION, WASHINGTON.

STEAM-COOKER.

SPECIFICATION forming part of Letters Patent No. 436,228, dated September 9, 1890.

Application filed March 27, 1890. Serial No. 345,554. (No model.)

*To all whom it may concern:*

Be it known that I, JANE E. FORD, a citizen of the United States, residing at Ross Station, King county, State of Washington, have invented an Improvement in Steam-Cookers; and I hereby declare the following to be a full, clear, and exact description of the same.

My invention relates to that class of steam-cookers in which the steam is generated from a body of water underlying a false bottom and passes up through suitably-arranged tubes into the utensil-compartment of the cooker.

My invention consists in the novel construction of the lower portion of the steam-cooker, including its false bottom, its supply-reservoir, its steam-tubes, and its supporting-plate; also in the construction of the top of the cooker, whereby a condensing-chamber is formed, and in the construction and arrangement of the utensils in connection with the receiving-compartment of the cooker, all of which, together with details, will be hereinafter fully described, and the several features of novelty specifically pointed out in the claims.

The object of my invention is to provide a simple and effective steam-cooker.

Referring to the accompanying drawings for a more complete explanation of my invention, Figure 1 is a vertical section of my steam-cooker. Fig. 2 is a horizontal section of same at the level of utensils F. Fig. 3 shows a modified cover to receive a coffee-pot.

A is a pan, which forms the bottom of the cooker, said pan having a suitable bottom—as, for example, one of copper—intended to better resist the action of the fire, and said bottom is provided with a number of indentations or depressions $a$, the purpose of which is to increase its heating-surface. The pan is provided with a false bottom B, which consists of a concavo-convex plate arranged with its convex side uppermost, whereby between said false bottom and the true bottom of the pan a water-chamber (represented by $b$) is formed. Through the false bottom near its outer rim are made the holes $b'$, whereby water from the pan may pass slowly as needed into the water-space $b$. The rim of the pan therefore acts as a reservoir for water, which supplies the water-space, as just mentioned.

C is the shell or body of the cooker, here shown as of a cylindrical shape. The base of this shell is set upon and secured to the false bottom B by a suitable water-tight joint, and said shell is smaller in diameter than the false bottom and the base of the pan, so that the reservoir for water is formed between the rim of the pan and the periphery of the shell, the inlet-holes $b'$ being in the base of this reservoir.

Within the shell near its lower portion is fitted a supporting-plate D, in which are secured the steam-tubes E, which open down through said plate and also through the false bottom B, thereby effecting a communication with the water-space $b$ below. The plate D forms a base or support for the utensils which are intended to be fitted within the shell.

The utensils F are made sector shape and are three in number, and said utensils when fitted together form a cylindrical whole, the diameter of which is just sufficiently smaller than the interior diameter of the shell to enable the three utensils to fit snugly within said shell, their bases resting upon the plate D. These utensils are hollow vessels provided with suitable covers, and one or more of them may be perforated. They are to contain the article to be cooked, and the object of making them of sector shape is to provide for a more thorough and rapid cooking of an article by reason of having it segregated into smaller masses, the interior of which can be reached by the heat more quickly than if the combined masses were in a single vessel.

G is another type of utensil consisting of an ordinary cylindrical vessel provided with a cover, said utensil being adapted to fit freely within the upper portion of the shell and to rest upon the series of utensils F below.

H is the cover of the cooker. This is formed with an interior flange $h$ on its under side, which is adapted to fit down within the top of the shell and form the true cover therefor. It is also provided with a deep outer flange $h'$, which having a diameter greater than that of the shell extends outwardly from it and leaves an annular space or chamber around the top of the shell. This spaces serves as a condensing-chamber, the steam escaping from the top of the shell passing into it, and, being condensed therein, drips down the exterior of the shell into the reservoir below.

In Fig. 3 I have shown a substitute cover I, provided with an aperture adapted to receive a coffee-pot J.

The operation of the cooker is as follows: Water is supplied to the bottom pan A and passes down through the holes $b'$ into the water-chamber $b$. The cooker is placed upon the stove or other source of heat, and as the steam is generated it passes up through the tubes E and into the upper portion of the shell, where it heats the cooking utensils. The escaping steam is condensed by the projecting flange $h'$ of the cover and falls down again into the bottom pan A.

Having thus described my invention, what I claim as new, and desire to secure by Letters Patent, is—

1. An improved steam-cooker consisting of a pan having a convex false bottom having rising therefrom the cylindrical shell C, provided with a transverse diaphragm or supporting-plate, tubes connecting this supporting-plate with the convex bottom, having their ends open and passing through the plate and false bottom, so as to communicate, respectively, with the space above and below them, suitable vessels or receptacles within the shell above the supporting-plate, and a cover for said shell, as herein described.

2. An improved steam-cooker consisting of a pan having a corrugated bottom and provided with a concavo-convex plate above said bottom, so as to form a water-chamber beneath a cylindrical shell, having a cover fitting its top and provided with a diaphragm or plate near its bottom and joined to the concavo-convex plate by means of tubes, whereby a passage is formed between the water-chamber below said plate and the space in the shell above the plate, and the sector-shaped utensils within the shell and supported upon said plate, all constructed and arranged to operate as herein described.

In witness whereof I have hereunto set my hand.

JANE E. FORD.

Witnesses:
EMILY THOMAS,
Mrs. C. A. TURNER.